June 10, 1969 C. C. ROUTH 3,449,696

DUAL SECTION ALL PASS LATTICE FILTER WHEREIN NONLINEARITIES OF TWO SECTIONS CANCEL

Filed April 12, 1965 Sheet 1 of 2

INVENTOR.
CLAUDE C. ROUTH
BY
Paul W. Fitch
T. L. Styner
ATTORNEYS

INVENTOR.
CLAUDE C. ROUTH
BY
[signatures]
ATTORNEYS 3,449,696

DUAL SECTION ALL PASS LATTICE FILTER WHEREIN NONLINEARITIES OF TWO SECTIONS CANCEL

Claude C. Routh, 2866 Eagle St., San Diego, Calif. 92103

Filed Apr. 12, 1965, Ser. No. 449,381
Int. Cl. H01p *5/12;* H03h *7/10*
U.S. Cl. 333—6 5 Claims

ABSTRACT OF THE DISCLOSURE

A plurality of cascaded lattice filter sections with series and shunt branches, contain tunable resonant and anti-resonant circuits, respectively. The design parameter, $af_o$, of one section is so chosen as to yield a phase shift which is substantially linear with the logarithm of the applied frequency $f_o$. If the resonant frequency of another section is a multiple of the resonant frequency of the branches of the one section the linearity of the network is extended.

The invention described herein may be manufactured and used by or for the Government of the United States of America for governmental purposes without the payment of any royalties thereon or therefor.

This invention relates to filters and is particularly directed to all-pass devices suitable for phase equalizing. More specifically, this invention is directed to filters of the LC type having a fast rise-time.

The object of this invention is to provide an improved filter which will shift the phase of applied frequencies an amount which is a uniform function of frequency over a wider range of frequencies. At the same time, the amplitude response versus frequency remains flat.

The filter of this invention comprises a four-terminal lattice section with series and shunt-connected branches. When the series and shunt branches comprise parallel and series resonant circuits, respectively, tuned to the same frequency, $f_o$, it is found that the wave applied to one end of the filter is shifted uniformly in phase in a lagging or leading direction as the applied frequency is shifted above or below the resonant frequency of the circuits. The series and parallel impedances are the reciprocal of each other. The required load of the circuit is then a constant resistance over the band. Now, by cascading a second or additional sections, tuned to a multiple of the frequency, $f_o$, it is possible to so add the phase shifts of the two or more sections as to produce a substantially straight line relationship between the log of the applied frequency and the phase shift.

Other objects and features of this invention will become apparent to those skilled in the art by referring to the specific embodiments described in the following specification and shown in the accompanying drawings in which.

Figure 1:
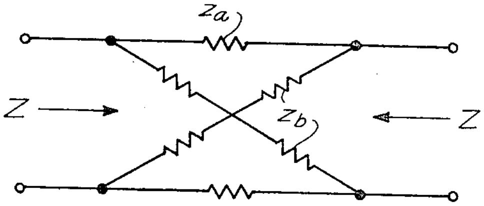
FIG. 1 shows diagrammatically the general configuration of a lattice filter section.

The filter of this invention comprises two or more classic lattice sections, shown in FIG. 1. In the lattice section the series impedances $Z_a$ and the cross or shunt impedances $Z_b$ are reciprocal impedances or are impedances of opposite signs. Impedances $Z_a$ and $Z_b$ are resonant circuits and are, respectively, parallel-tuned circuits and series-tuned circuits, the resonant frequency of each of which is $f_o$. The image impedance of the lattice section depends only upon the product of the two branch impedances, whereas the image transfer constant depends only upon the ratio of these impedances.

Figure 2:
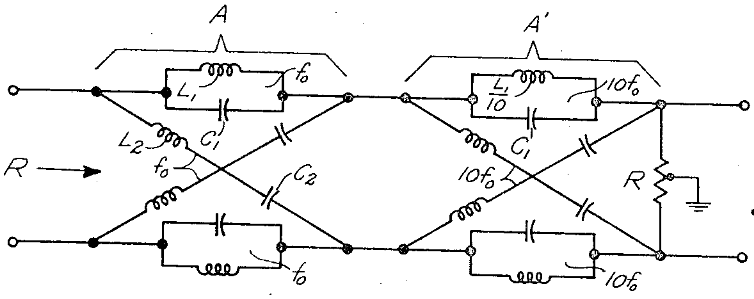
FIG. 2 is a schematic circuit diagram of two lattice filter sections cascaded according to this invention.

The particular filter shown in FIG. 2 comprises two cascaded sections, section A and section A′. Section A comprises the parallel resonant circuit including inductance $L_1$ and capacitance $C_1$ in the series legs of the section. Each shunt branch of this section is a series resonant circuit and comprises inductance $L_2$ and capacitance $C_2$. The section A has four balanced branches, as shown.

The design equations for the filter section A are as follows:

$$L_1=aR/2\pi$$
$$C_1=1/af_o^2 2\pi R$$
$$L_2=L_1/(af_o)^2$$
$$C_2=C_1(af_o)^2$$
$$\tan \theta/2=-af_o(f/f_o)/1-(f/f_o)^2$$
$$R=\sqrt{L_1}/\sqrt{C_2}$$

where R is the resistance of the terminal load, the L's and C's are as shown in FIG. 2, $f_o$ is the resonant frequency of the tuned circuits, and the constant $a$ is a parameter of the filter section determined, by the ratio of the L's and C's of the resonant circuits once R and $f_o$ are chosen. As will appear below, the $af_o$ factor becomes important in the design of a section which will produce a substantially linear phase versus frequency plot, when frequency is plotted on a logarithmic scale.

Figure 3:
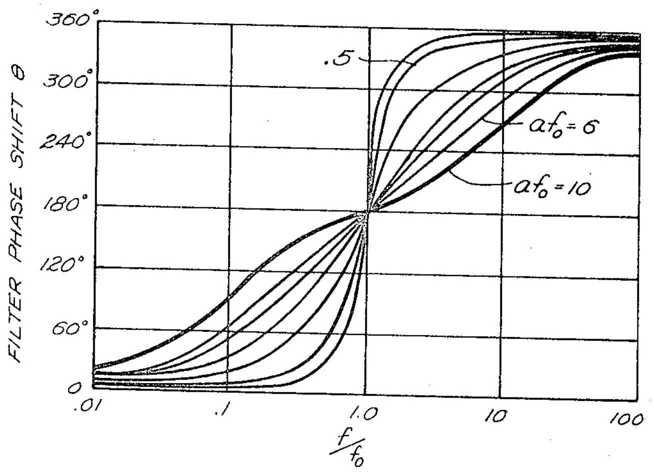
FIG. 3 shows some of the phase versus frequency characteristics of one lattice section of the filter of FIG. 1.

The phase response of the duopole circuit of FIG. 2, having two poles in its transfer function, can be varied by changing the $af_o$ of the branches as shown in FIG. 3. That is, the branches are assumed to be resonant at the frequency $f_o$, and changing the $L/C$ ratio means the parameter $af_o$ is adjusted for a fixed terminal load R. As indicated in FIG. 3, the curvature of the phase-frequency characteristic can be lessened by increasing $af_o$. The parameter $af_o$ can be selected to produce a reasonably straight phase-shift characteristic, and at a value of 10 for $af_o$, the curvature of the characteristic is slightly sinusoidal and is symmetrical about the resonant frequency, $f/f_o=1.0$, of the filter branches.

Figure 4:
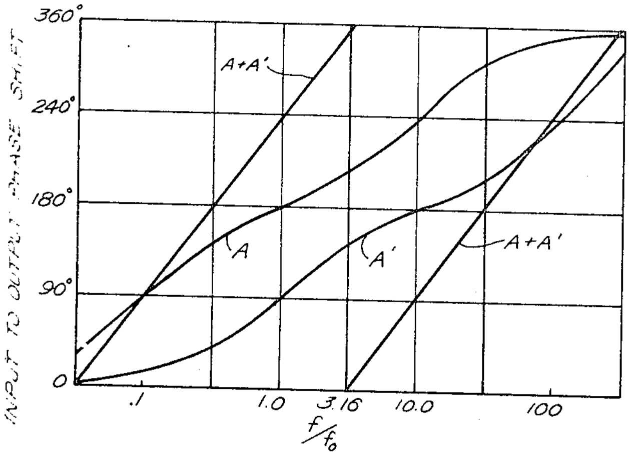
FIG. 4 shows a set of phase versus frequency characteristics of two cascaded lattice sections of the filter of FIG. 1.

Now, according to an important and characteristic feature of this invention, a second lattice section is cascaded with the first and is so designed as to produce a second phase-frequency characteristic displaced from the first so that the sum of the two can extend the straight line portion of the characteristic of FIG. 3 as well as neutralize the sinusoidal deviations from the straight line. Preferably, both sections have the same $af_o$ value, such as 10. Inasmuch as the two sections A and A′ are in tandem as shown in FIG. 2, the phase-frequency characteristic A is added to the phase-frequency characteristic A′ to produce the straight line $A+A'$ of FIG. 4. That is, deviations of A′ can be made to complement and neutralize deviations of A. Linearity can easily be produced within a few degrees throughout the frequency range $f/f_o$, from .4 to 150.

Figure 5:
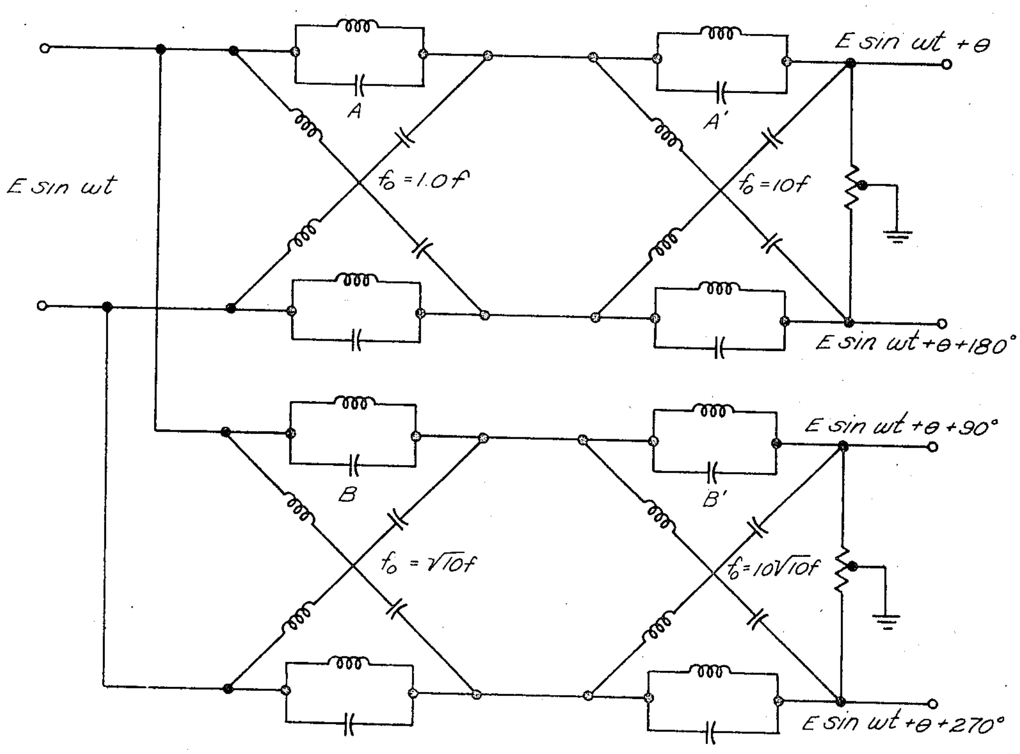
FIG. 5 is a circuit schematic diagram of a specific application of the filter of FIG. 1.
Figure 6:
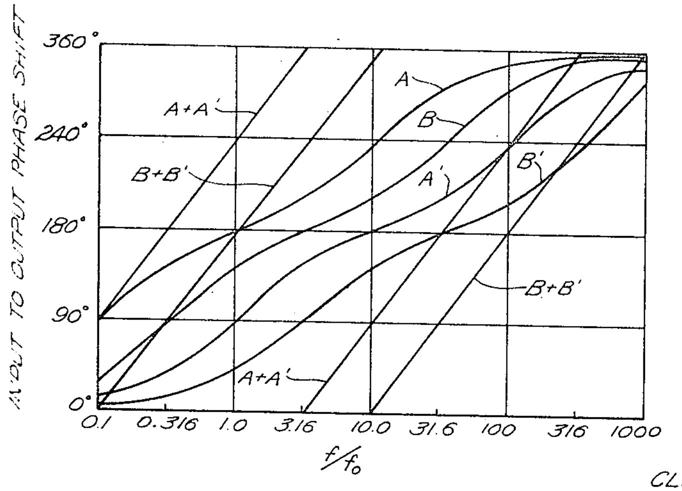
FIG. 6 is a phase angle versus frequency characteristic of the two filters of the system of FIG. 5.

Many uses can be found for the linear phase-frequency characteristic of this invention. According to another feature of this invention, two cascaded lattice networks can be connected in multiple, with a common frequency source, as shown in FIG. 5, and the resonant frequencies of the branches so selected as to produce two voltages with a fixed predetermined phase displacement therebetween throughout a wide frequency range. If, for example, the resonant frequency of the branches of lattice section A is $f_0$, then the resonant frequency of the lattice section B may be selected at about $\sqrt{10f_0}$ so that the phase-frequency characteristic B is shifted to the right, in FIG. 6, with respect to phase-frequency characteristic of section A. Now, to minimize the non-linear variations of characteristic B, the second section of B′ is cascaded with section B, as shown in FIG. 5. The resonant frequency of the resonant circuits of the branches of lattice network B′ is now $10\sqrt{10f_0}$. As expected, the two pairs of additions $A+A'$ and $B+B'$ produce the two straight lines which are 90° apart throughout the frequency range from .4 to 45 $f/f_0$ within a few degrees.

The design equations mentioned above indicate that if the load resistance is the same for all four sections, the inductance and capacity values cover a range of from 3160 to 1. If the load resistance of one channel is 10 times the resistance of the second channel the range can be changed to 1000 to 1 for the inductors and 10,000 to 1 for the capacitors.

Many modifications may be made in the parameters of this invention without departing from the scope of the appended claims.

What is claimed is:

1. A plurality of cascaded filter sections, each section being of the lattice type with series and shunt branches, the branches containing tunable resonant and anti-resonant circuits, respectively;
the design parameter, $af_0$, of one section being chosen to yield a phase shift which is substantially a linear function of th elogarithm of applied frequency, where $f_0$ is the resonant frequency of the branches of said one section and $a$ is a constant scubstantially as dedescribed; and
the resonant frequency of the branches of another of said cascaded lattice filter sections being chosen equal to a predetermined multiple of the resonant frequency of the branches of said one section to substantially neutralize deviations from linearity of said phase shift-to-frequency characteristic.

2. A wide-band filter system comprising;
two four-terminal lattice filter sections with series and shunt branches;
the series and shunt branches of each lattice section comprising tunable resonant circuits having mutually reciprocal impedances;
said two sections being coupled in multiple;
the design factor, $af_0$, of said two sections being approxmately the same, where the factor $f_0$ is the resonant frequency of the resonant circuits of said series and shunt branches and where $a$ is the ratio of the applied frequency to said resonant frequency,
the resonant frequency of the branches of one of said sections being a fraction of the resonant frequency of the branches of the other of said sections so that the phase of the voltage at the output terminals of one section is shifted a predetermined amount with respect to the phase of the output voltage of the other section throughout a wide band of applied frequencies.

3. In the filter system defined in claim 1;
the resonant frequency of the branches of said second filter section being substantially ten times the resonant frequency of the branches of said first filter section for an $af_0$ of 10.

4. An all pass filter comprising a first and a second four terminal lattice section connected in cascade;
said first section comprising four symmetrical impedance branches, two complementary branches being series resonant to the predetermined frequency $f_0$ and the other two branches being parallel resonant to said frequency $f_0$ so that the image impedance of the section is substantially constant at all frequencies, and
said second section comprising four symmetrical impedance branches, two complementary branches being series resonant and the other two branches being parallel resonant to a frequency which is a predetermined multiple of said frequency $f_0$ so that the sum of the phase shifts of the two sections is substantially a linear function of the logarithm of the frequency throughout the band of applied signals.

5. A wide-band filter system comprising;
a first four-terminal lattice filter section with series, and shunt branches;
a second four-terminal lattice filter section with series and shunt branches;
the series and shunt branches of each lattice section comprising tunable resonant circuits having mutually reciprocal impedances;
said first and second sections being coupled in cascade;
the resonant frequency of the branches of the first section being a predetermined multiple of the resonant frequency of the branches of the second section so that the phase of the voltage at the output terminals of one section is shifted with respect to the output voltage of the other section, so that the resultant phase shift is a linear function of the logarithm of the applied frequency over a wide band;
a third and a fourth four-terminal lattice filter section with tunable resonant circuits of reciprocal impedances, respectively, in the series and shunt branches of the sections,
said third and fourth sections being connected in cascade and in parallel to common signal-source terminals with said first and second sections,
the branches of said first section being tuned to frequency $f_0$, and the branches of said second, third, and fourth sections being tuned, respectively, to approximately $10f_0$, $\sqrt{10f_0}$, and $10\sqrt{10f_0}$.

References Cited

UNITED STATES PATENTS

| | | | |
|---|---|---|---|
| 3,122,716 | 2/1964 | Whang | 333—28 |
| 2,249,415 | 7/1941 | Bode | 333—74 |
| 1,989,545 | 1/1935 | Cauer | 333—70 |
| 2,342,638 | 2/1944 | Bode | 333—70 |
| 2,922,128 | 1/1960 | Weinberg | 333—74 |
| 1,828,454 | 10/1931 | Bode | 333—70 |
| 1,600,290 | 9/1926 | Martin | 333—74 |
| 2,024,900 | 12/1935 | Wiener et al. | |

HERMAN KARL SAALBACH, *Primary Examiner.*
C. BARAFF, *Assistant Examiner.*

U.S. Cl. X.R.

333—74, 28